United States Patent [19]
Nagata

[11] Patent Number: 5,298,935
[45] Date of Patent: Mar. 29, 1994

[54] CAMERA PHOTOGRAPHIC LIGHT SOURCE DETERMINING APPARATUS

[75] Inventor: Toru Nagata, Tokyo, Japan
[73] Assignee: Canon Kabushiki Kaisha, Tokyo, Japan
[21] Appl. No.: 5,214
[22] Filed: Jan. 15, 1993
[30] Foreign Application Priority Data Jan. 20, 1992 [JP] Japan .................................. 4-027551

[51] Int. Cl.⁵ .............................................. G03B 7/08
[52] U.S. Cl. ................................................... 354/430
[58] Field of Search .......................... 354/430; 358/29

[56] References Cited
U.S. PATENT DOCUMENTS 4,947,196 8/1990 Wash et al. ...................... 354/106 X

FOREIGN PATENT DOCUMENTS 58-53327 11/1983 Japan .

Primary Examiner—W. B. Perkey
Attorney, Agent, or Firm—Fitzpatrick, Cella, Harper & Scinto

[57] ABSTRACT

A camera photographic light source determining apparatus has a photometric section for measuring light in a plurality of different ranges, a determination section for determining a photometric range of the plurality of different ranges, in which a main light source for illuminating an object is present, in response to the photometric section, and a detection section for detecting the type of the main light source in response to the determination section.

44 Claims, 8 Drawing Sheets

CAMERA PHOTOGRAPHIC LIGHT SOURCE DETERMINING APPARATUS

BACKGROUND OF THE INVENTION

1. Field of the Invention

The present invention relates to a light source determining apparatus for determining the type of a photographic light source so as to improve photographic results regardless of the type of camera used, such as a still or movie video camera or a silver salt camera.

2. Description of the Related Art

It is conventional that a video camera has a colorimetric sensor for providing white balance. Japanese Patent Publication No. 58-53327 discloses a technique that in a silver salt camera, a light source is detected, and the detected information is recorded on a film so as to automate or simplify classification of negatives during printing. U.S. Pat. No. 4,947,196 discloses a method of recording photographic information corresponding to each photographic frame on the transparent magnetic layer coated on the film base side.

In the above conventional light source detection techniques, it is assumed that a light source is composed of a single color. These techniques employ a single colorimetric sensor or an imaging device. On the other hand, under the condition in which different light sources are mixed, for example, when a fluorescent lamp is used for artificial lighting, in combination with natural light, i.e., daylight, streaming through a window, a dominating light source at a camera position or in a camera angle of view is frequently different from a light source illuminating a main object to be photographed. In this case, the conventional techniques have the drawback that the color of the main object cannot be satisfactorily reproduced.

SUMMARY OF THE INVENTION

According to one aspect of the present invention, there is provided a camera photographic light source determining apparatus comprising photometric means for performing photometry of a plurality of different ranges, determination means for determining a photometric range from the plurality of photometric ranges, in which a main light source for illuminating an object is present, in response to the photometric means; and detection means for detecting the type of the main light source in response to the determination means; whereby the type of the light source illuminating the object can be determined even under the condition that light source colors are mixed, that is, different light sources are present.

Other aspects of the present invention will become apparent from the following description of preferred embodiment of the present invention.

DETAILED DESCRIPTION OF THE PREFERRED EMBODIMENTS

Preferred embodiments of the present invention will now be described with reference to the accompanying drawings.

Figure 1:
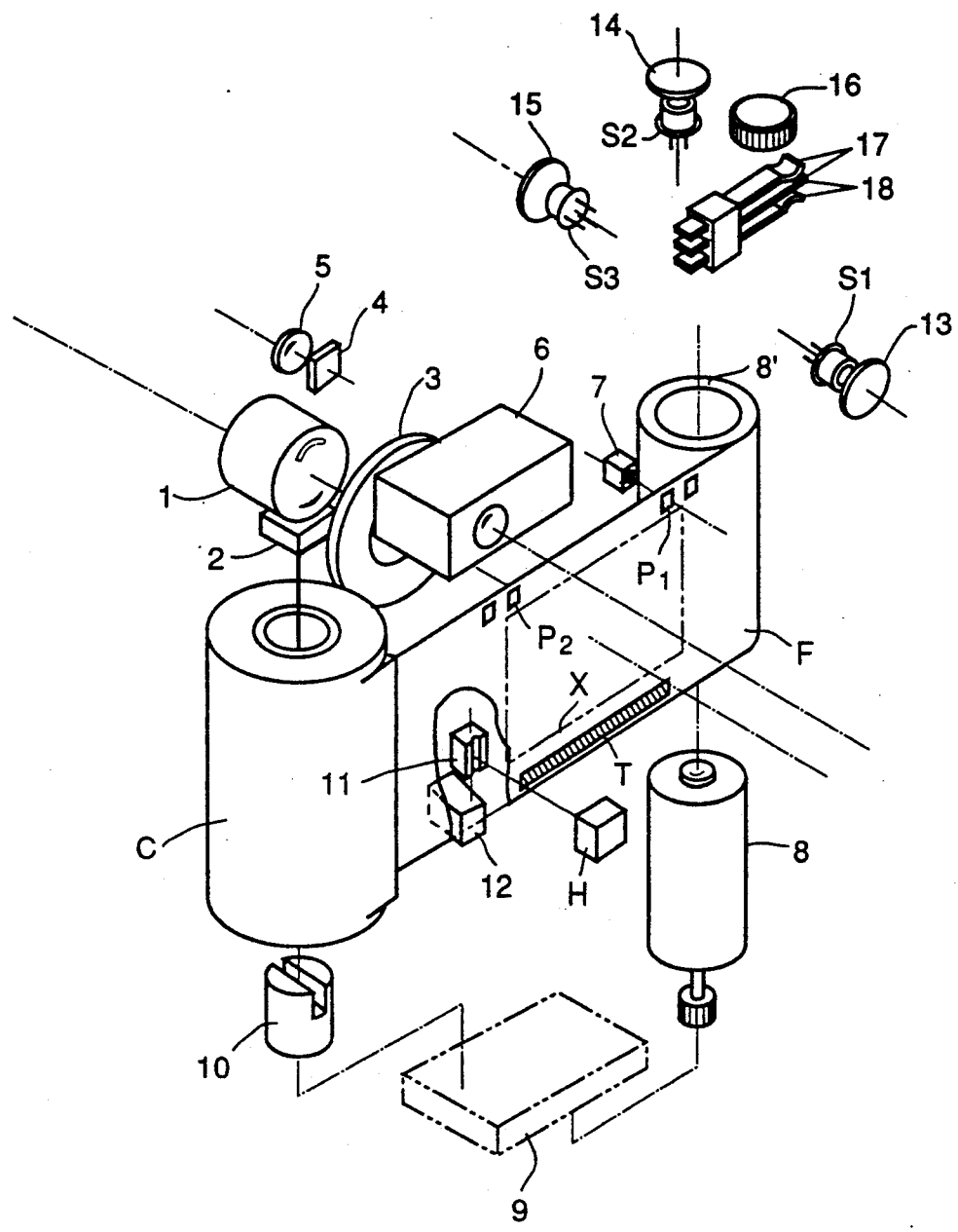
FIG. 1 is an exploded perspective view showing the main components of a camera according to an embodiment of the present invention.
Figure 2:
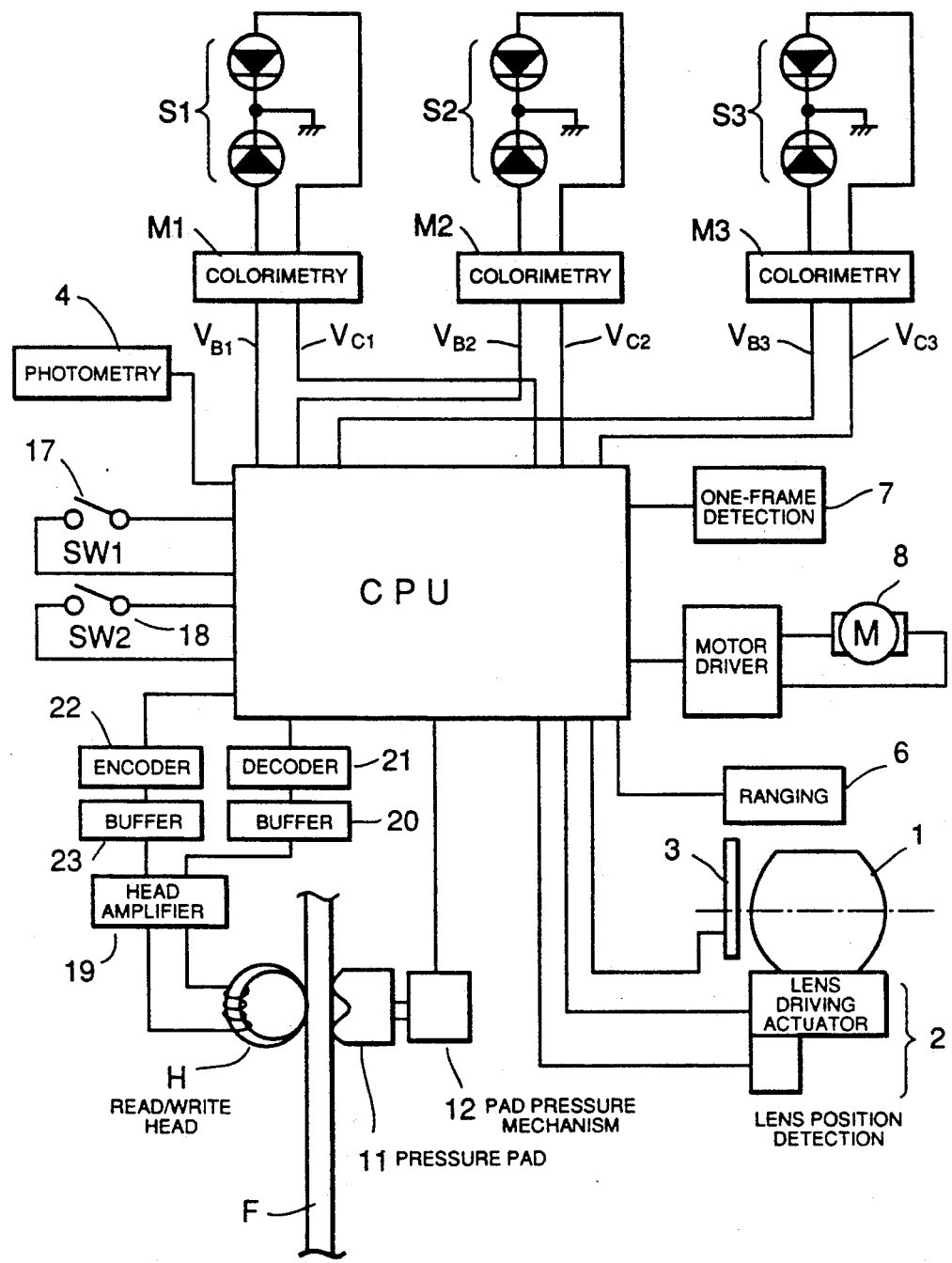
FIG. 2 is a block diagram of the electric circuit of the camera shown in FIG. 1.
Figure 3I:
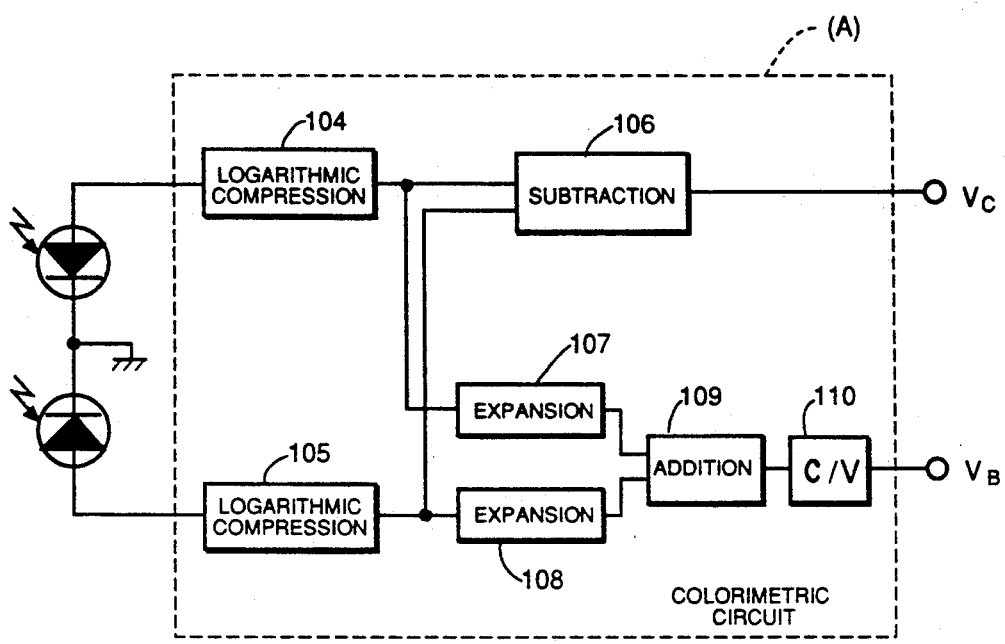
FIG. 3(i) is a block diagram showing the main components of a colorimetric sensor according to the embodiment of the present invention.
Figure 3:
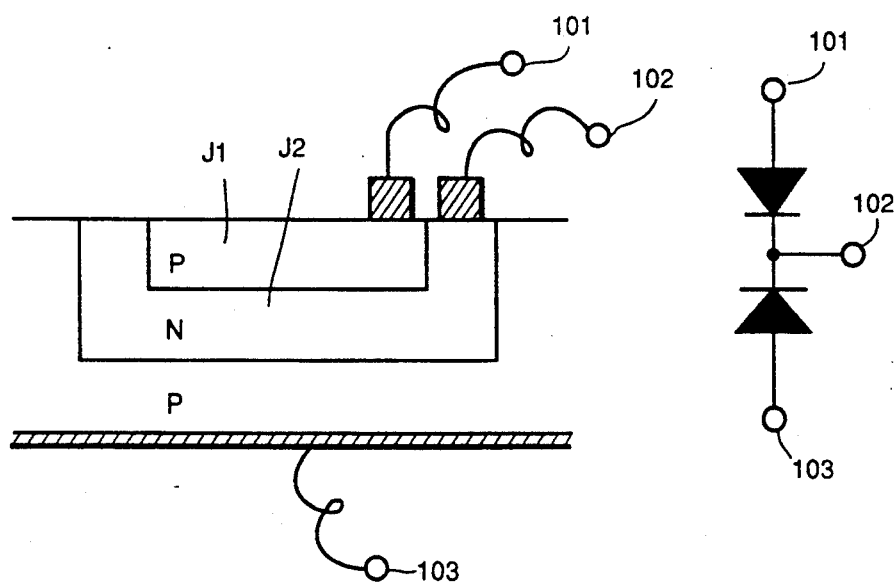
FIG. 3(ii) is a schematic drawing showing correspondence between the section of an element of the sensor of this embodiment and the terminals in a circuit diagram.

FIGS. 1, 2, and 3 show the components of a light source determining apparatus according to an embodiment of the present invention. In the drawings, reference numeral 1 denotes a photographic lens; reference numeral 2, a lens actuator for driving the photographic lens 1 and a lens encoder for generating lens position signals; reference numeral 3, a lens shutter; reference numeral 4, an auto-exposure photometric sensor; reference numeral 5, a lens for determining the acceptance angle of the photometric sensor 4; reference numeral 6, a ranging block and a finder block; reference numeral 7, a photoreflector for detecting perforations P1 and P2 of a film F so as to transport the film F a standard length; reference numeral 8, a film transport motor disposed in a spool 8'; reference numeral 9, a gear train for switching winding/rewinding and for performing speed reduction; and reference numeral 10, a rewinding fork. Reference character C denotes a film cartridge, reference character F denotes the film having a magnetic layer coated on the base side thereof, reference characters P1 and P2 denote the perforations corresponding to a photographic image plane X, and reference character H denotes a magnetic head for writing information to a track T on the film F. Reference numeral 11 denotes a pressure pad for pressing the film on the head H, the pressure pad 11 having a recessed portion for increasing contact pressure between the film F and a central portion of the head gap, and reference numeral 12 denotes a pad retract mechanism for pressing the pad 11 on the head H under a predetermined pressure only during film transport. Reference characters S1, S2, and S3 denote colorimetric sensors; and reference numerals 13, 14, and 15 denote white diffusion plates respectively corresponding to the colorimetric sensors S1, S2, and S3. The colorimetric sensors S1, S2, and S3 have sensitivity to the regions in the rear of, above, and in front of the camera, respectively. Reference numeral 16 denotes a release button; reference numeral 17, a switch (referred to as "SW1" hereinafter) for starting photometry and ranging; and reference numeral 18, a switch (referred to as "SW2" hereinafter) for starting shutter opening and the sequence of film transport. Referring to FIG. 2, reference numerals M1, M2, and M3 denote colorimetric circuits to which the output of each of the colorimetric sensors S1, S2, and S3 is respectively input, and which output luminance signals $V_{B1}$, $V_{B2}$, and $V_{B3}$ and color signals $V_{C1}$, $V_{C2}$, and $V_{C3}$, respectively.

The operation sequence of the camera now will be described. When the film cartridge C is loaded in the camera, the entire film F is first wound around the spool 8'. At the same time, the sensitivity of the film, the specified number of film frames taken and the type of the film, all of which are recorded on the magnetic layer in the track T, are read by the magnetic head H. The information read is amplified by the head amplifier 19, converted by an A/D converter, and then transmitted to a buffer 20. The information is transmitted to a decoder 21, which decodes the information and transmits it to a CPU. The CPU counts the number of frames on the basis of the output from the photoreflector 7, which detects perforations in the film F to identify each frame and then stops winding when the number of frames reaches the specified number of film frames read in advance. The switch SW1 is turned on to perform ranging, photometry and colorimetry, and obtained information is processed by the CPU to establish an exposure standby state. The colorimetric signal processed by the CPU is converted into light source information, coded by an encoder 22 and then stored in a buffer 23. When the switch SW2 is turned on, the lens driving actuator 2 drives the camera lens 1 until stop instructions are given from the CPU, and focuses the camera lens. After the shutter 3 is then opened for the time determined by the output from the photometric sensor 4, one-frame rewinding is performed until the specified amount of film rewinding is detected. During this time, the coded light source information is sent to the magnetic head H from the buffer 23 through the head amplifier 19 and is written to the track T of the film F. When photography of a predetermined number of frames is completed, rewinding is continued until the entire film enters the cartridge C and then stopped.

The sequence during use is described above. During this sequence, the pressure pad 11 is brought into pressure contact with the head H only during movement of the film F so as to ensure reading and writing of magnetic information.

An embodiment of a colorimetric sensor will be described below with reference to FIGS. 3(i) and 3(ii). In the construction shown in FIG. 3(ii), two PN junctions are laminated on a silicon substrate. Since the distances of the two junctions from the surface of the silicon substrate are different from each other, a first junction J1 has a sensitivity peak at a shorter wavelength, and a second junction J2 has a sensitivity peak at a longer wavelength. As a result, the ratio of the short-circuit currents from both junctions varies in proportion to the wavelength of an incident light. As shown by (A) in FIG. 3(i), in an actual circuit, the currents are respectively subjected to logarithmic compression by logarithmic compression circuits 104 and 105 and are then subjected to subtraction by a subtraction circuit 106 to obtain a color signal $V_C$. In addition, the currents are respectively reexpanded by expansion circuits 107 and 108 and are then subjected to addition by an addition circuit 109 to obtain a luminance signal $V_B$ through a current/voltage (C/V) conversion circuit 110. Another colorimetric sensor in which a RGB primary color filter is provided on a Silicon Photo Cell (hereinafter called SPC) by a filter-on-chip process is brought into practical use. For example, $\Sigma(V_R+V_G+V_B)$ and $\ln V_R - \ln V_B$ can be used as a luminance signal and a color signal, respectively.

Figure 7:
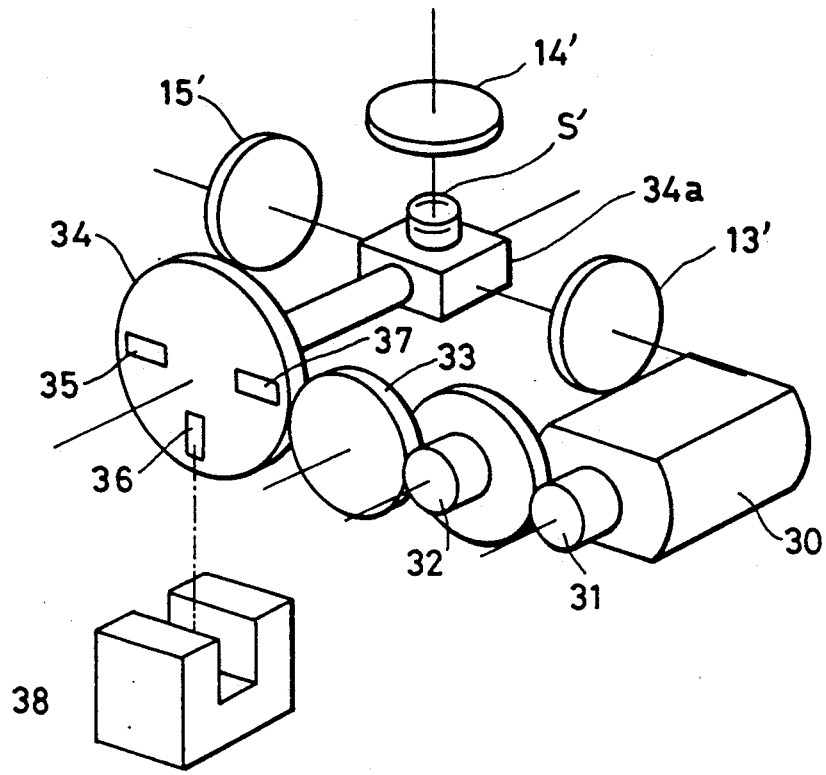
FIG. 7 is an exploded perspective view showing the components of a colorimetric sensor according to another embodiment of the present invention.

FIG. 7 illustrates the main components of a colorimetric sensor according to another embodiment of the present invention. In the drawing, reference character S' denotes a colorimetric sensor, reference numerals 13', 14', and 15' denote white diffusion plates fixed to the camera body, reference numeral 30 denotes a motor for controlling the direction of the colorimetric sensor S', and reference numeral 31 denotes a pinion gear fixed to the output shaft of the motor 30. Reference numerals 32 and 33 denote reduction gears, and reference numeral 34 denotes an output gear having an arm 34a to which the colorimetric sensor S' is fixed and having three slits 35, 36, and 37 corresponding to the direction of the colorimetric sensor S'. Reference numeral 38 denotes a photointerrupter for detecting the positions of the output gear 34 and of the colorimetric sensor S' by detecting the presence of the slit 35, 36, or 37.

Although the first embodiment has a plurality of colorimetric sensors, this embodiment has a single colorimetric sensor. The motor 30 is electrically charged so as to align the colorimetric sensor S' with the direction determined by Step 203 in the flow chart shown in FIG. 4, and is stopped when the presence of the slit 35, 36, or 37 is detected by photointerrupter 38.

Figure 8:
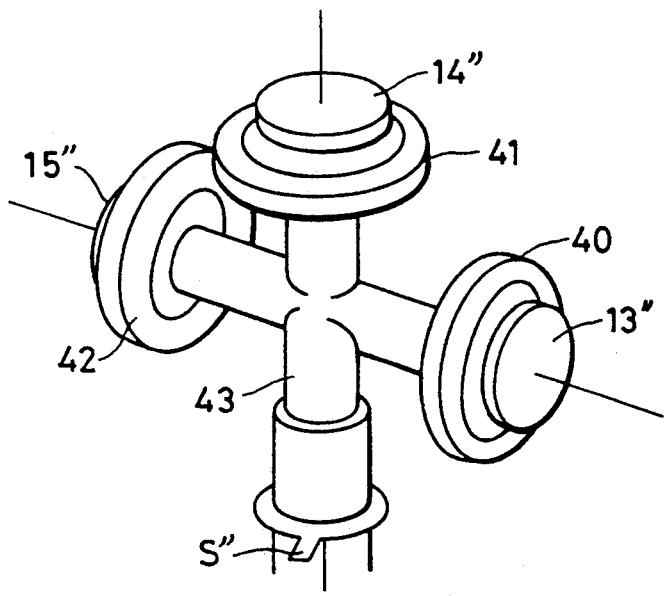
FIG. 8 is a perspective view showing a colorimetric sensor according to a further embodiment of the present invention.

FIG. 8 is a schematic drawing showing the main components of a colorimetric sensor according to a third embodiment of the present invention. In the drawing, reference character S" denotes a colorimetric sensor, reference numerals 13", 14", and 15" denote white diffusion plates fixed to the outer surface of the body, reference numeral 43 denotes a light guide for guiding the light passed through each of the diffusion plates 13" to 15" to the sensor S", and reference numerals 40, 41, and 42 denote shutters respectively provided between the diffusion plates 13", 14", and 15" and the light guide 43. Each of the shutters 40, 41, and 42 may be a mechanical shutter or a liquid crystal shutter.

In all the above embodiments, hereinafter the output of a light-receiving range at the rear of the camera is referred to as output (1), the output of a light-receiving range above the camera is referred to as output (2), and the output of a light-receiving range in front of the camera is referred to as output (3).

The operation of the circuit block shown in FIG. 2, particularly the method of determining a photographic light source, will be described in detail below with reference to the flow chart shown in FIG. 4.

Figure 4:
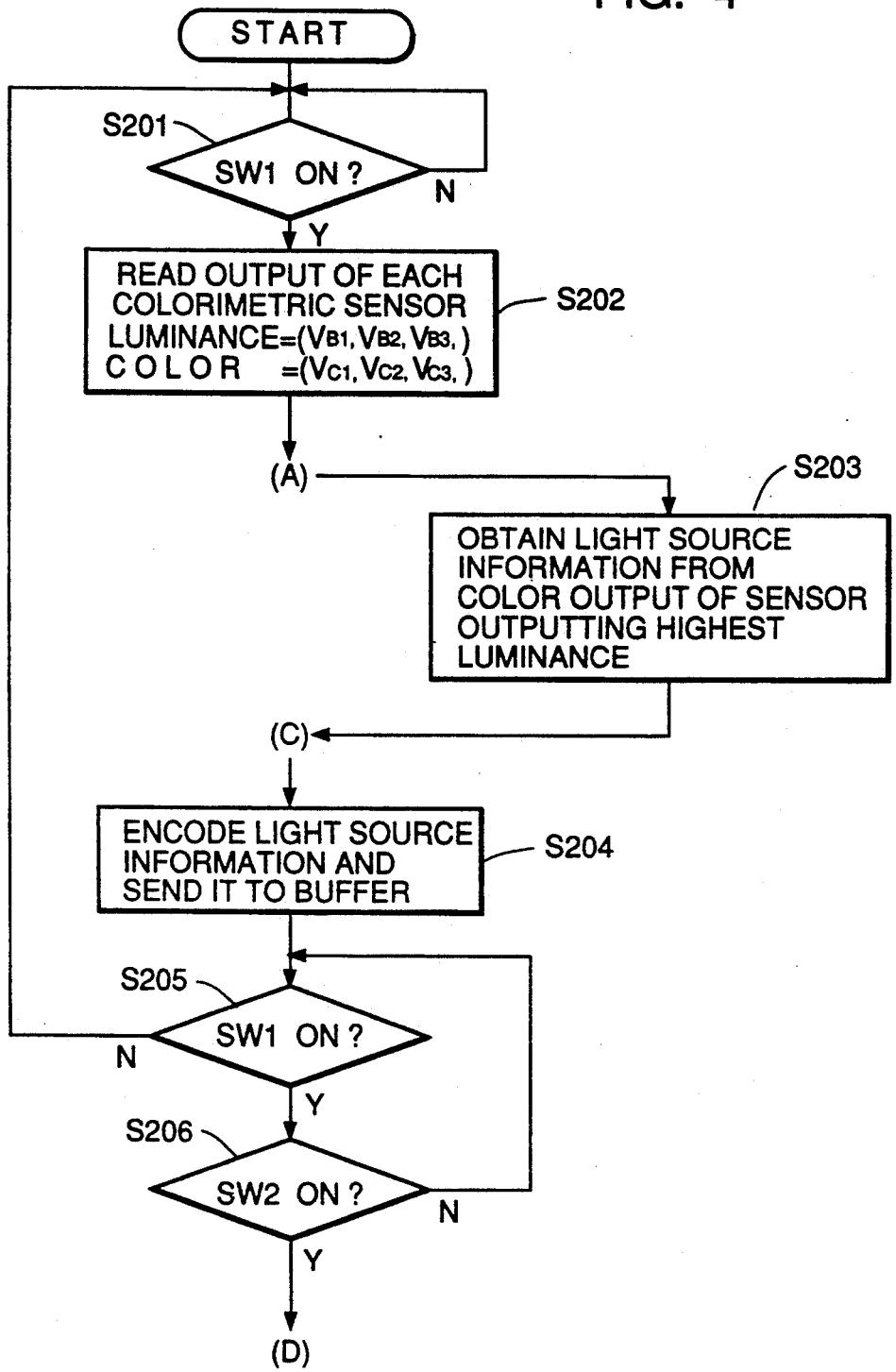
FIG. 4 is a flowchart showing an operation of the embodiment shown in FIG. 1.

In FIG. 4, a state of the switch SW1 is first determined (Step 201 referred to as "S201" hereinafter). When the switch SW1 is turned on, the flow moves to S202. Although the usual photographic sequence (ranging, photometry) is performed (S202), ranging and photometry are generally known and are thus not described. The luminance signals $V_B$ and the color signals $V_C$ in the light-receiving ranges of the colorimetric sensor in the three directions are then successively read (S202). In the steps of A through C shown in FIG. 4, the light-receiving range having the highest luminance signal $V_B$ is determined as a photographic light source, and the type of the light source is decided by the color signal $V_C$ of the light-receiving range. This step will be described below. The type of the light source determined is coded in the form of data to be written on the film in S203, and is stored in a buffer (S204). It is again confirmed that the switch SW1 is turned on (S205). If the switch SW1 is turned off, the flow returns to the start, and if the switch SW1 is turned on, the flow moves to the next S206, and a state of the switch SW2 is determined. The release sequence after the turning on of switch SW2 will be described below.

Figure 5:
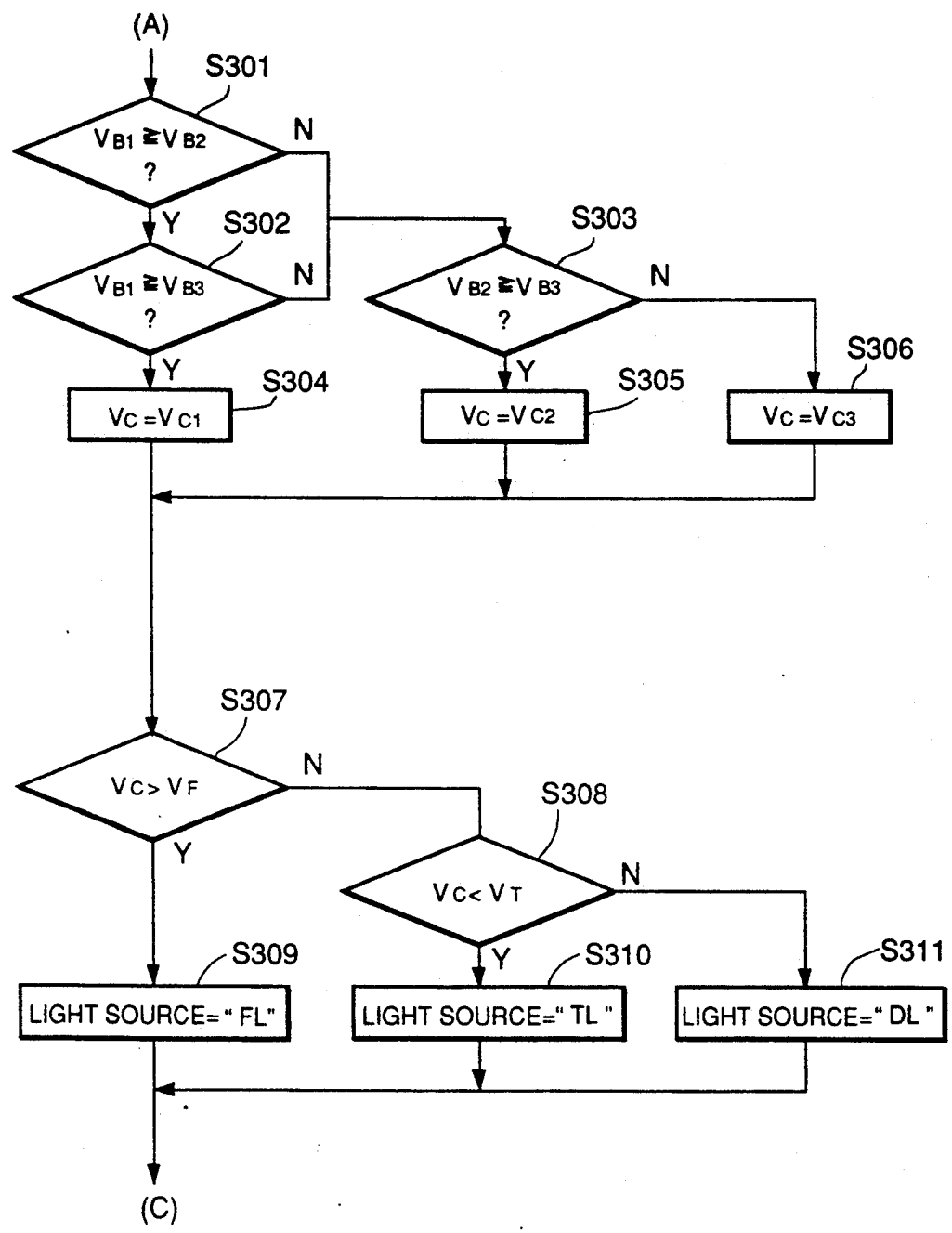
FIG. 5 is a flowchart showing an operation of the embodiment shown in FIG. 1.

The sequence of determining the light source shown in FIG. 5 will be described below. Since the color signal $V_C$ of the colorimetric sensors shown in FIG. 3 outputs a voltage proportional to the dominating color of the light source colors, the voltage intensity is in the order of tungsten light < daylight < fluorescent lamp corresponding to the order of red < yellow < green. It is thus assumed that the switching voltage between tungsten light "TL" and daylight "DL" is $V_T$, and that the switching voltage between daylight "DL" and fluorescent lamp "FL" is $V_F$. The order of the voltages depends upon the spectral sensitivity characteristic of the light-receiving element in the sensor, and the method described herein is not necessarily decisive.

The actual sequence is described below. In FIG. 5, the process for determining the photographic light source comprises steps S301 through S306, and the means for determining a light source color comprises steps S307 through S311.

The luminance signal $V_{B1}$ of the output (1) of the light receiving range at the rear of the camera is compared with the luminance signal $V_{B2}$ of the output (2) of the light receiving range above the camera (S301). If $V_{B1}$ is greater than or equal to $V_{B2}$, the flow moves to S302, and if $V_{B2}$ is greater than $V_{B1}$, the flow moves to S303. When $V_{B1}$ is greater than or equal to $V_{B2}$, the luminance signal $V_{B1}$ of the output (1) is then compared with the luminance signal $V_{B3}$ of the output (3) of the light receiving range in front of the camera (S302). If $V_{B1}$ is greater than or equal to $V_{B3}$, the flow moves to S304, and if $V_{B3}$ is greater than $V_{B1}$, the flow moves to S303. When $V_{B2}$ is greater than $V_{B1}$ in S301, and when $V_{B3}$ is greater then $V_{B1}$ in S302, the luminance signal $V_{B2}$ of the output (2) is compared with the luminance signal $V_{B3}$ of the output (3). If $V_{B2}$ is greater than or equal to $V_{B3}$, the flow moves to S305, and if $V_{B3}$ is greater than $V_{B2}$, the flow moves to S306.

When the luminance signal $V_{B1}$ is the maximum of $V_{B1}$, $V_{B2}$, and $V_{B3}$, the color signal $V_C$ is set equal to the color signal $V_{C1}$ of the output (1) (S304).

When the luminance signal $V_{B2}$ is the maximum of $V_{B1}$, $V_{B2}$, and $V_{B3}$, the color signal $V_C$ is set equal to the color signal $V_{C2}$ of the output (2) (S305).

When the luminance signal $V_{B3}$ is the maximum of $V_{B1}$, $V_{B2}$, and $V_{B3}$, the color signal $V_C$ is set equal to the color signal $V_{C3}$ of the output (3) (S306).

The color signal $V_C$ set in S304, S305, or S306 is then compared with the switching voltage $V_F$ between daylight "DL" and fluorescent lamp "FL" (S307). If the color signal $V_C$ is smaller than or equal to the switching voltage $V_F$, the flow moves to S308, and if the color signal $V_C$ is greater than $V_F$, the flow moves to S309. When the color signal $V_C$ is smaller than or equal to the switching voltage $V_F$, the color signal $V_C$ is further compared with the switching voltage $V_T$ between tungsten light "TL" and daylight "DL" (S308). If the color signal $V_C$ is smaller than the switching voltage $V_T$, the flow moves to S310, and if the color signal $V_C$ is greater than or equal to the switching voltage $V_T$, the flow moves to S311. As a result, if $V_C > V_F$, it is determined that the light source color is the fluorescent lamp "FL" (S309). If $V_C < V_T$, it is determined that the light source color is the tungsten light "TL" (S310). If $V_T < V_C < V_F$, it is determined that the light source color is the daylight "DL" (S311).

As described above, the light source having information of the highest luminance is determined to be the photographic light source, and the determination sequence is completed and returns to the main sequence.

Figure 6:
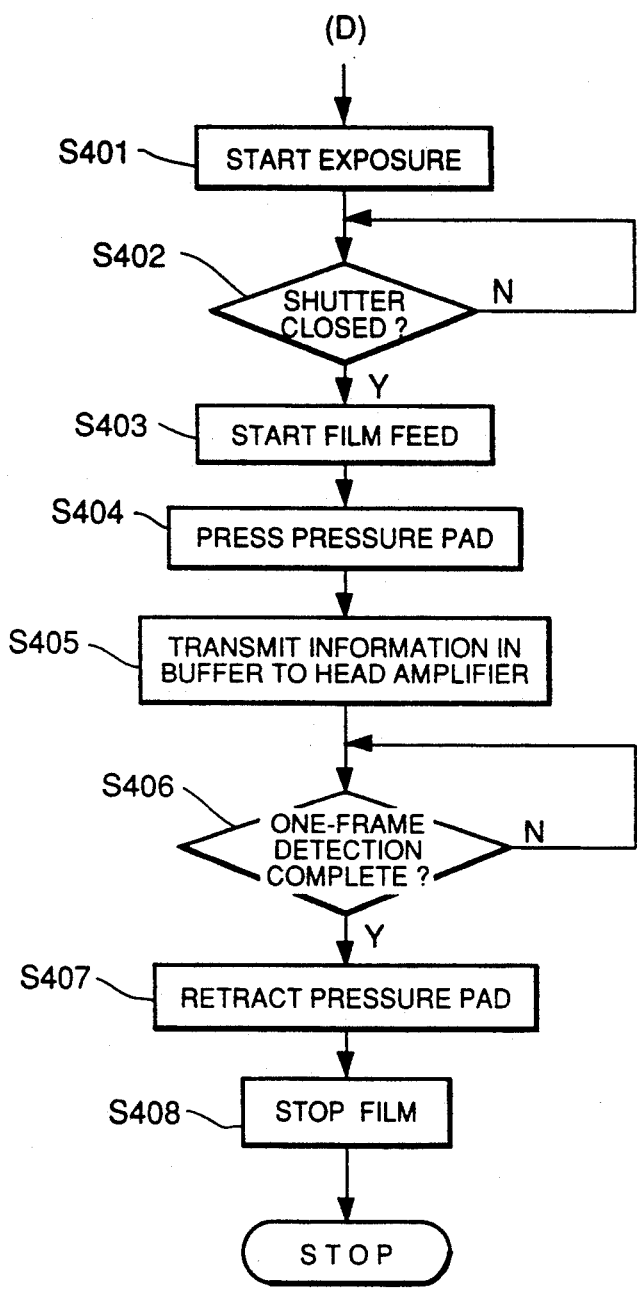
FIG. 6 is a flowchart showing an operation of the embodiment shown in FIG. 1.

The release sequence will now be described below with reference to FIG. 6. When the switch SW2 is turned on, the shutter 3 is opened, and exposure is started (S401). The shutter is opened until the closing signal is generated from the CPU, and is closed by the closing signal which marks the end of the exposure (S402). After the shutter is closed, the film transport is started (S403), and at the same time, the pressure pad 11 is brought into pressure contact with the magnetic head H (S404). During this process, the information of the light source color stored in the buffer 23 is sent to the magnetic head H through the head amplifier 19 and written to the film F (S405). One-frame detection is then made (S406) so that the head is retracted (S407), and the film transport is stopped (S408).

Although the method of recording the information about the light source on the film employs magnetic recording as an example, optical recording may be employed by an LED or the like in place of the magnetic recording, as seen from known recording techniques.

As described above, since the light source color of a light source having the highest luminance can be selectively detected, only the light source having large influences on the illumination light of an object can be detected.

Figure 9:
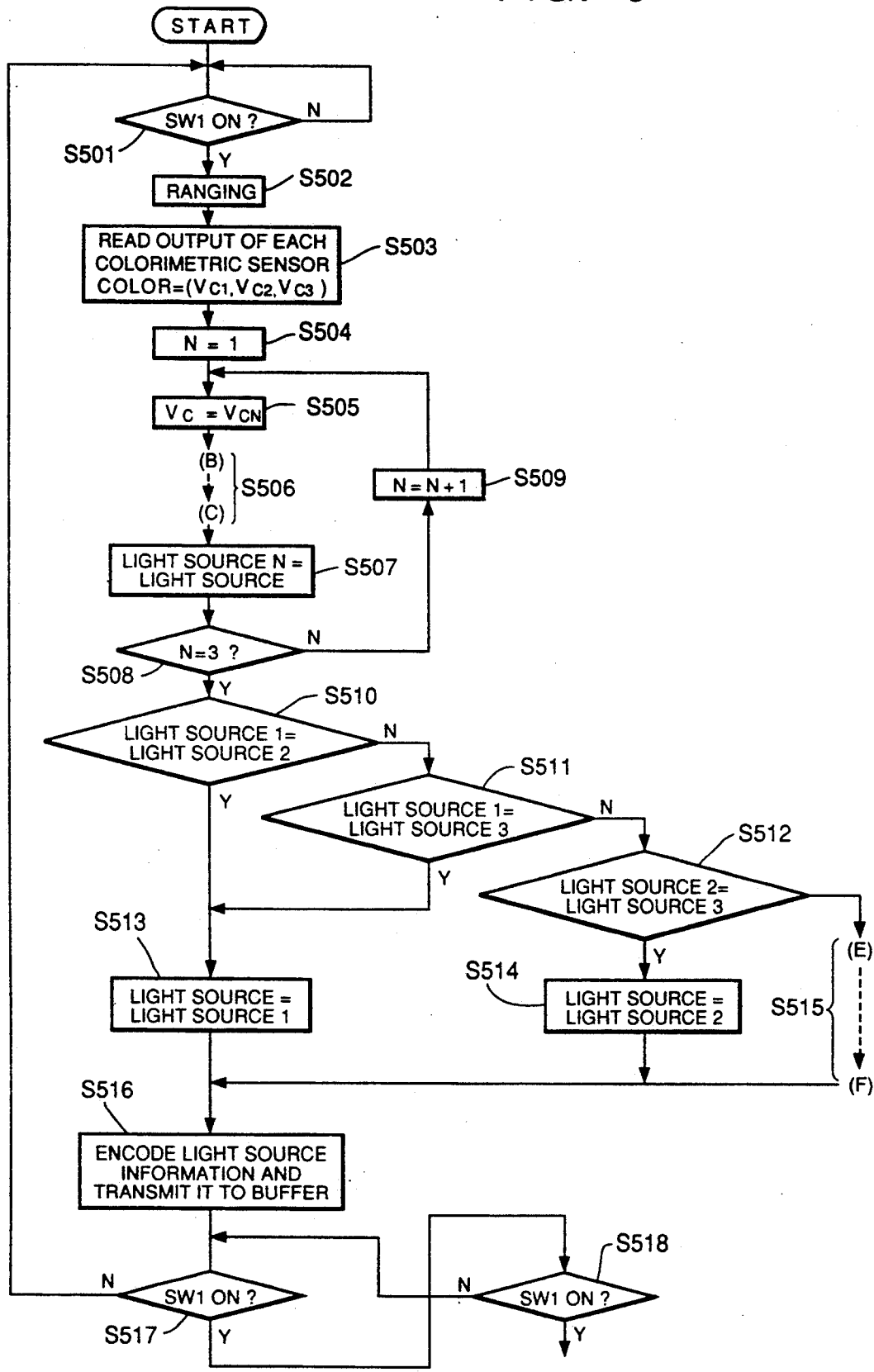
FIG. 9 is a flowchart showing an operation according to yet another embodiment of the present invention.

Another embodiment of the present invention is described below with reference to FIG. 9. FIG. 9 is a flowchart showing an operation of another embodiment of the circuit block shown in FIG. 2. In FIG. 9, a state of the switch SW1 is first determined (S501). When the switch SW1 is turned on, ranging is performed, and a range signal D is obtained (S502). Color signals $V_{C1}$, $V_{C2}$, and $V_{C3}$ respectively corresponding to the light receiving ranges of the respective colorimetric sensors are read (S503). The counter N is set to N=1 (S504), and a light source color determination signal $V_C$ is set equal to $V_{CN}$ (S505). The process for determining the type of a light source comprises step S506. A light source Color is determined by the signal $V_{CN}$. Since the signal processing is the same as the processing in the steps S307 to S311 shown in FIG. 5, they are not again described. It is thus determined that a light source is "F", "T", or "D". It is also determined on the basis of the number N in the counter that the light source N is a light source (S507). If N=3, the flow moves to S510, and if N remains less than 3, the flow moves to S509. The counter N is counted up by one, and the flow moves to S505.

The above loop provides a determination of the three light sources 1, 2, and 3 respectively corresponding to the light-receiving ranges of the colorimetric sensors. Each of the light sources 1, 2, and 3 has the value of "FL", "TL", or "DL". The value of the light source 1 (light-receiving range at the rear of the camera) is compared with the value of the light source 2 (light-receiving range above the camera) (S510). If the values are the same, the flow moves to S513, and if both values are different, the flow moves to S511. When the values are different, the value of the light source 1 is compared with the value of the light source 3 (light receiving range in front of the camera) (S511). If the values are the same, the flow moves to S513, and if the values are different, the flow moves to S512. The value of the light source 2 is compared with the value of the light source 3 (S512). If the values are the same, the flow moves to S514, and if the values are different, the flow moves to S515. If the results of comparison in S510 and S511 show that the value of a light source 1 is equal to the value of the light source 2 or 3, the value of the light source 1 is used as information on the light source (S513). This is because it is considered on the basis of the concept of decision by majority that the light source color in a majority, i.e., the light source color of the light source 1, is dominant. If the results of comparison in S512 show that the value of the light source 2 is equal to the value of the light source 3, the value of the light source 2 is used as information on the light source. The reason for this is the same as that for S513 Unlike the above results, when the values of the light sources 1, 2, and 3 are different from each other, the value of the information on the light source is determined by the following method (S515):

(a) When a subject distance is short, it is determined that a light source=light source 1 (rear) because the portion of an object which faces the camera and which is illuminated from the rear side of the camera is important.

When a subject distance is long, it is determined that a light source=light source 3 (front) because it is generally thought that the object is mainly illuminated by circumferential light. It was found from experiment that the threshold level is established when the subject distance is preferably about 20 times the focal length of a photographic lens.

(b) When no information on the subject distance can be obtained, it is determined that a light source=light source 1 (rear) because it is thought to be safe that the subject is handled in the same manner as that used in the case of a short subject distance.

(c) The information on the light source having highest luminance is used.

The process for determining the photographic light source comprises the above steps S510 through S515.

Since the steps S516 through S518 are the same as the steps S204 through S206 shown in FIG. 4, they are not again described. The release sequence shown in FIG. 6 is continued from (D) in FIG. 4

In this embodiment, since the dominating light source for illumination is determined by majority, it is possible to increase the possibility that the light source actually illuminating a subject can be detected.

As described above, the above embodiments cause colorimetric sensors to be respectively provided with a plurality of light-receiving ranges so that an optimum light-receiving range is selected in accordance with the state of the light source. There is thus the effect that the type of the light source illuminating a subject can be accurately determined even when different light sources are mixed.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera photographic light source determining apparatus comprising:
   (A) photometric means for performing photometry of a plurality of different ranges;
   (B) determination means for determining a photometric range of the plurality of different ranges, where a main light source for illuminating an object is present, in response to said photometric means; and
   (C) detection means for detecting a type of the main light source in response to said determination means.

2. An apparatus according to claim 1, wherein said photometric means comprises means for performing photometry of a region at the rear of a camera.

3. An apparatus according to claim 2, wherein said photometric means comprises means for performing photometry of a region above the camera.

4. An apparatus according to claim 3, wherein said photometric means comprises means for performing photometry of a region in front of the camera.

5. An apparatus according to claim 2, wherein said photometric means comprises means for performing photometry of a region in front of the camera.

6. An apparatus according to claim 1, wherein said photometric means comprises means for performing photometry of a region in front of the camera.

7. An apparatus according to claim 1, wherein said determination means comprises means for making the determination on the basis of an intensity of photometric luminance.

8. An apparatus according to claim 1, wherein said determination means comprises means for determining the photometric range having a highest photometric luminance as the photometric range where the main light source is present.

9. An apparatus according to claim 1, wherein said detection means comprises means for detecting a type of the main light source on the basis of wavelength.

10. An apparatus according to claim 1, wherein said determination means comprises means for weighting in accordance with the range subjected to photometry by said photometric means to obtain results of the determination.

11. An apparatus according to claim 1, wherein said determination means comprises means for making the determination on the basis of a wavelength of a light measured by said photometric means.

12. An apparatus according to claim 11, wherein said determination means comprises means for weighting in accordance with the plurality of photometric ranges.

13. An apparatus according to claim 12, wherein said determination means comprises means for giving preference to a region at the rear of the camera among the plurality of photometric ranges.

14. An apparatus according to claim 13, wherein said determination means comprises means for giving preference to a region above the camera next to the region at the rear of the camera among the plurality of photometric ranges.

15. An apparatus according to claim 11, wherein said determination means comprises means for determining a region at the rear of a camera as the photometric range where the main light source is present when the wavelength of the light measured by said photometric means in the region at the rear of the camera is the same as that measured in a region above the camera.

16. An apparatus according to claim 1, wherein said determination means comprises means for comparing a wavelength of a light measured by said photometric means in accordance with the plurality of photometric ranges.

17. An apparatus according to claim 16, wherein said determination means comprises means for weighting in accordance with the plurality of photometric ranges.

18. An apparatus according to claim 17, wherein said determination means comprises means for giving preference to a region at the rear of a camera among the plurality of photometric ranges.

19. An apparatus according to claim 18, wherein said determination means comprises means for giving preference to a region above the camera next to the region at the rear of the camera among the plurality of photometric ranges.

20. An apparatus according to claim 1, further comprising recording means for recording results of detection by said detection means on a film.

21. A camera comprising:
(A) photometric means for performing photometry of a plurality of different ranges;
(B) determination means for determining a photometric range of the plurality of different ranges, where a main light source for illuminating an object is present, in response to said photometric means; and
(C) detection means for detecting a type of the main light source in response to said determination means.

22. A camera according to claim 21, wherein said photometric means comprises means for performing photometry of a region at the rear of a camera.

23. A camera according to claim 22, wherein said photometric means comprises means for performing photometry of a region above the camera.

24. A camera according to claim 23, wherein said photometric means comprises means for performing photometry of a region in front of the camera.

25. A camera according to claim 22, wherein said photometric means comprises means for performing photometry of an region in front of the camera.

26. A camera according to claim 21, wherein said photometric means comprises means for performing photometry of a region in front of a camera.

27. A camera according to claim 21, wherein said determination means comprises means for making the determination on the basis of an intensity of photometric luminance.

28. A camera according to claim 21, wherein said determination means comprises means for determining the photometric range having a highest photometric luminance as the photometric range where the main light source is present.

29. A camera according to claim 21, wherein said detection means comprises means for detecting a type of the main light source on the basis of wavelength.

30. A camera according to claim 21, wherein said determination means comprises means for weighting in accordance with the range subjected to photometry by said photometric means to obtain results of the determination.

31. A camera according to claim 21, wherein said determination means comprises means for making the determination on the basis of a wavelength of a light measured by said photometric means.

32. A camera according to claim 31, wherein said determination means comprises means for weighting in accordance with the plurality of photometric ranges.

33. A camera according to claim 32, wherein said determination means comprises means for giving preference to a region at the rear of a camera among the plurality of photometric ranges.

34. A camera according to claim 33, wherein said determination means comprises means for giving preference to a region above the camera next to the region at the rear of the camera among the plurality of photometric ranges.

35. A camera according to claim 31, wherein said determination means comprises means for determining a region at the rear of a camera as the photometric range where the main light source is present when the wavelength of the light measured by said photometric means in the region at the rear of the camera is the same as that measured in a region above the camera.

36. A camera according to claim 21, wherein said determination means comprises means for comparing a wavelength of a light measured by said photometric means in accordance with the plurality of photometric ranges.

37. A camera according to claim 36, wherein said determination means comprises means for weighting in accordance with the plurality of photometric ranges.

38. A camera according to claim 37, wherein said determination means comprises means for giving preference to a region at the rear of a camera among the plurality of photometric ranges.

39. A camera according to claim 38, wherein said determination means comprises means for giving preference to a region above the camera next to the region at the rear of the camera among the plurality of photometric ranges.

40. A camera according to claim 21, further comprising recording means for recording results of detection by said detection means on a film.

41. An apparatus according to claim 1, wherein said determination means comprises means for making the determination by majority on the basis of a wavelength of a light measured by said photometric means.

42. An apparatus according to claim 1, wherein said determination means comprises means for making the determination by majority.

43. A camera according to claim 21, wherein said determination means comprises means for making the determination by majority on the basis of a wavelength of a light measured by said photometric means.

44. A camera according to claim 21, wherein said determination means comprises means for making the determination by majority.

* * * * *